United States Patent
Merkel et al.

(10) Patent No.: US 7,493,176 B2
(45) Date of Patent: Feb. 17, 2009

(54) LOW-VOLTAGE MODULE

(75) Inventors: Hans-Peter Merkel, Schriesheim (DE); Gunnar Zank, Teutschenthal (DE)

(73) Assignee: ABB Patent GmbH, Ladenburg (DE)

( * ) Notice: Subject to any disclaimer, the term of this patent is extended or adjusted under 35 U.S.C. 154(b) by 146 days.

(21) Appl. No.: 10/552,277

(22) PCT Filed: Mar. 23, 2004

(86) PCT No.: PCT/EP2004/003040

§ 371 (c)(1),
(2), (4) Date: Sep. 14, 2006

(87) PCT Pub. No.: WO2004/089051

PCT Pub. Date: Oct. 14, 2004

(65) Prior Publication Data

US 2007/0052298 A1 Mar. 8, 2007

(30) Foreign Application Priority Data

Apr. 4, 2003 (DE) .............................. 103 15 623

(51) Int. Cl.
*G05B 15/00* (2006.01)
*G05B 19/18* (2006.01)
*G05D 3/12* (2006.01)
*H01H 33/02* (2006.01)
*G01R 21/06* (2006.01)

(52) U.S. Cl. .............................. 700/1; 700/2; 700/292; 218/155; 702/60

(58) Field of Classification Search ............. 700/1, 700/2, 292; 218/155; 702/60
See application file for complete search history.

(56) References Cited

U.S. PATENT DOCUMENTS 4,769,557 A    9/1988   Marasch et al.

(Continued)

FOREIGN PATENT DOCUMENTS

DE      94 16 303      12/1994

(Continued)

OTHER PUBLICATIONS

Trase et al., "Description of the PMAD System Test Bed Facility and Data System" 1992 NASA Lewis Research Center, p. 3-7.*

(Continued)

*Primary Examiner*—Albert DeCady
*Assistant Examiner*—Thomas H Stevens
(74) *Attorney, Agent, or Firm*—Buchanan Ingersoll & Rooney PC

(57) ABSTRACT

A switchgear assembly module is disclosed. The switchgear assembly module is for controlling and monitoring at least one electrical load in an outgoer of a low-voltage switchgear assembly, and has at least one communication interface for connection to a bus system, and a programmable controller and having configurable protective functions. The switchgear assembly module is formed from interchangeable components and has at least one central unit as well as at least one bus connection unit with a communication interface. Additional connection slots are provided for holding at least one power unit and at least one input/output unit. An internal bus is provided for communication from the central unit with the other components for the central unit to process data received from the other components which are located in the switchgear assembly module.

17 Claims, 1 Drawing Sheet

U.S. PATENT DOCUMENTS

| | | | | |
|---|---|---|---|---|
| 6,032,203 | A | * | 2/2000 | Heidhues .................. 710/11 |
| 2004/0036461 | A1 | * | 2/2004 | Sutherland ................. 323/355 |

FOREIGN PATENT DOCUMENTS

| DE | 199 60 870 | 6/2001 |
|---|---|---|
| EP | 0 696 829 | 2/1996 |
| EP | 0 994 559 | 4/2000 |
| EP | 1 256 861 | 11/2002 |

OTHER PUBLICATIONS

Watson et al., "Single-Chip Microcontrollers for Switchgear Control" 1991 Texas A & M p. 122-127.*

* cited by examiner

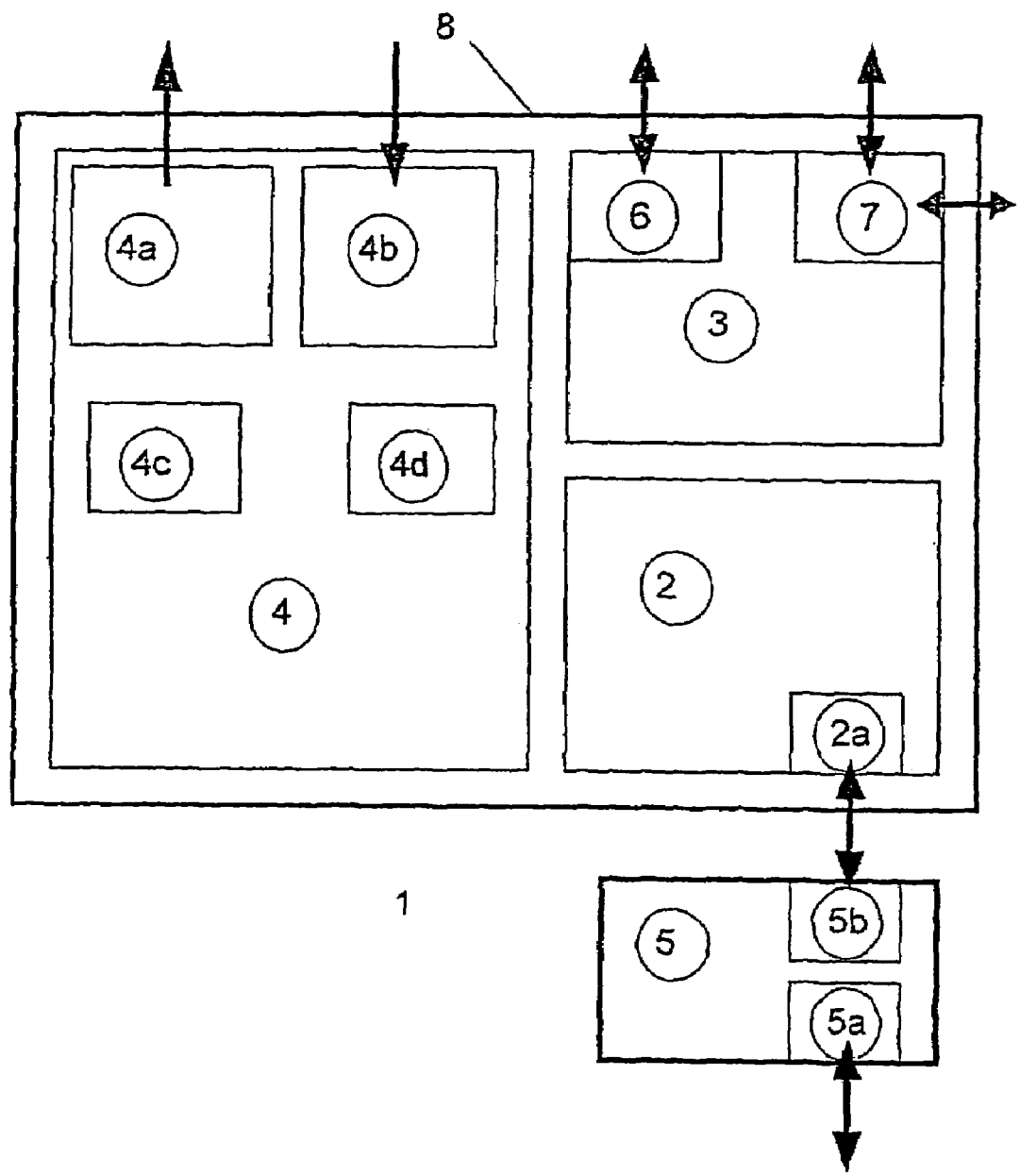

LOW-VOLTAGE MODULE

This application claims priority under 35 USC § 119 to German application No. 103 15 623.2, filed Apr. 4, 2003, and under 35 USC §371 to International Application No. PCT/EP2004/003040, filed Mar. 23, 2004, the contents of which are incorporated herein by reference in their entirety.

The invention relates to a device for controlling and monitoring an electrical load in the outgoer of a low-voltage switchgear assembly, such as a motor.

The document DE 94 16 303 describes a drive control device for open-loop control, closed-loop control and switching of an electric motor, which drive control device comprises a motor switching and control device. This control device has a communication interface, by means of which it is connected to a field bus which allows it to communicate with a control system via the field bus. The control device also has inputs for detection of binary and analogue signals, in particular for measurement of the motor load current and of any fault current. It also has a power section with thyristors for driving the motor or a contactor. There are no other binary or analogue outputs. The central components of the motor switching and control device are an integrated programmable controller and programmable motor protective functions.

The control device represents a prefabricated unit which cannot be configured. All of the components are permanently accommodated in a common housing, and it is not envisaged that individual components will be replaced. Since one control device is intended for a large number of applications, it is not always optimally configured for specific applications. Thus, for example, the integrated, three-phase power electronics which can switch heavy currents are not required when the aim is to drive a contactor; in this situation, an electromagnetic relay would make more sense, since it occupies less space and results in reduced power losses.

The object of the invention is to provide a device for controlling and monitoring electrical loads in low-voltage installations, which can be flexibly matched to the respective requirement.

According to the invention, the object is achieved by a switchgear assembly module having the features stated in claim 1. Further advantageous refinements of the invention are specified in the further claims.

The switchgear assembly module according to the invention for controlling and monitoring an electrical load in the outgoer of a low-voltage switchgear assembly is formed from a plurality of separate components which can each be replaced individually. This modular configuration allows the switchgear assembly module to be matched to the respective intended application, for example for controlling a motor or a power outgoer.

A switchgear assembly module contains one or more central units and one or more bus connection units, with each bus connection unit having a communication interface for connection to a bus system. The switchgear assembly module can communicate via this communication interface and via the bus system with other appliances, for example with control stations in a control system. Communication interfaces exist for field bus systems, for example Profibus, and for control networks, for example the Ethernet. The use of two or more bus connection units allows redundant bus operation, or operation on different buses.

Furthermore, connection slots are provided for holding one or more power units as well as one or more input/output units. The switchgear assembly module has an internal bus, to which all of the components are connected and via which the central unit communicates with the other components. The internal bus may be both a serial bus and a parallel bus.

The central unit has a microprocessor and associated data memory, and contains a programmable controller and configurable protective functions. An application-specific program may be loaded in the programmable controller. The central unit uses this program to process the data received from the other components. The protective functions for protection of the load to be controlled can also be configured on an application-specific basis. The central unit may have an external interface for connection of a control/configuration unit or of a programmer.

The external interface of the central unit may be an electrical interface, for example RS232 with a 9-way SUB-D connector. It may also be an optical interface with optocouplers, providing DC isolation between the switchgear assembly module and the programmer. A further improvement is to use a wire-free or cable-free connection, for example by means of an infrared interface (IrDa) or a radio link.

Various input/output units which can be used for the connection of further sensors and actuators are available for flexible matching to the respective application. Input/output units with binary inputs exist for detection of position or other messages, with binary outputs for driving actuators, with analogue inputs for measured value detection, and with analogue outputs for presetting nominal values. Furthermore, input/output units are provided which have a combination of binary and analogue inputs and outputs.

The bus connection units and input/output units which are used in the switchgear assembly module can be combined to form one component, and thus together form an interface unit. If the required supply voltages for the components and component elements of the switchgear assembly module are not available in the switchgear assembly, a power supply unit is provided for the voltage supply, and can likewise be integrated in the interface unit.

A further component of the switchgear assembly module is the power unit. This has a feed section, which is connected to a main voltage supply, for example to a busbar in the switchgear assembly, and an outgoer section to which the load to be controlled is connected, generally via a cable or cables. Furthermore, the power unit contains a measurement device and a processing unit. When the load is connected, the current flows from the busbar via the feed section through the power unit and via the outgoer section to the load.

The power unit may also contain a main switching device and a switch disconnector. The main switching device may be an electromechanical contactor or a circuit breaker, although controlled power semiconductors, for example thyristors are also feasible. The switch disconnector may be manually operable or may be provided with an electrical drive.

The object of the measurement device is to detect analogue measured values, in particular the currents in the supply lines to the load. The voltages on the supply lines (star or delta voltages) and temperatures, for example the air temperature in the power unit or contact temperatures, can also be detected. The measurement device has the sensors required for detection of these values, for example the respectively required number of conventional current transformers, cable conversion converters, shunt resistors, voltage converters, voltage transformers, capacitive voltage dividers and temperature sensors.

One advantageous refinement of the invention provides for the connection of further sensors for measurement of further environmental variables, such as pressure, gas concentration, humidity, moisture or force. Sensors such as these can be used, for example, to provide fire alarm monitoring or condensation monitoring.

The power unit also has a processing unit, which is an electronic circuit. The processing unit has analogue and binary inputs for reading the values measured by the measurement device and the position messages from the main switching device and the switch disconnector. Further status messages, for example for monitoring an integrated safety unit or for detection of an emergency-off command, can also be read. In addition, outputs are provided which can be used to drive the main switching device and the switch disconnector (provided this has an electrical drive), or other appliances.

The processing unit reads the values measured by the measurement device, and converts them to digital values. When currents and voltages are being measured, it also uses these measured values to calculate the real power current, wattless component and volt-amperes supplied to the load, as well as the power factor, that is to say the ratio of the real power to the volt-amperes. It also optionally uses a current or voltage waveform to calculate the frequency of the mains supply system.

By way of example, the processing unit has a digital signal processor and appropriate data memory for this purpose.

A control/configuration unit is provided for local control of the switchgear assembly module and, depending on the embodiment, may have visual indications for displaying status messages and analogue values, for example the measured currents, as well as switches and keys, inter alia for inputting switching commands. The control/configuration unit also allows configuration of the protective functions of the switchgear assembly module.

The control/configuration unit is connected via a first interface to the external interface of the central unit.

This first interface of the control/configuration unit may likewise be an electrical, optical or wire-free interface, in the same way as the external interface of the central unit.

In one development of the control/configuration unit, a second interface is provided, to which a programmer can be connected.

The programmer for programming the central unit may thus on the one hand be connected directly to the external interface of the central unit or, if a control/configuration unit is connected, to the second interface of the control/configuration unit.

The second interface of the control/configuration unit may also be an electrical, optical or wire-free interface.

The programmable controller is generally programmed and the protective functions are configured by means of a programmer which is a standard PC or a standard PDA and in which a specific programming interface is installed.

In one advantageous refinement of the invention, the programming interface and a web server are integrated in the central unit, thus allowing the programming and configuration to be carried out with the aid of a standard web browser which is installed in a standard PC or a standard PDA. This also allows simple control of the switchgear assembly module, that is to say indications of measured values and status messages as well as the inputting of switching commands, by means of the standard web browser.

The central unit may additionally also be programmed and configured via the bus connection unit and the connected bus system from a programming location. It is also possible to use the web server integrated in the central unit in this situation as well, so that only one standard web browser is required at the programming location. The same applies to the control and monitoring of the switchgear assembly module from a control station which is connected to the bus system.

One exemplary embodiment and details of the invention will be explained in more detail with reference to the following drawing.

The single FIGURE shows, schematically, the design of a switchgear assembly module according to the invention. A central unit 2, a bus connection unit 6, an input/output unit 7 and a power unit 4 are located in the interior of the switchgear assembly module 1. The bus connection unit 6 and the one input/output unit 7 together form an interface unit 3.

The bus connection unit 6 and the input/output unit 7 are each connected by means of plug connectors in the rear wall 8 of the switchgear assembly module 1 to the appropriate mating connectors in the insert compartment of the switchgear assembly. Individual interfaces of the input/output unit 7 may also be connected by wiring to another outer wall of the switchgear assembly module 1.

The feed section 4b and the outgoer section 4a of the power unit 4 are also connected by means of plug connectors in the rear wall 8 of the switchgear assembly module 1 to the appropriate mating connectors in the insert compartment of the switchgear assembly. The power unit 4 also has a switch disconnector, which is not shown here, a main switching device, which is not shown here, a measurement device 4c and a processing unit 4d.

The central unit 2 contained in the switchgear assembly module 1 has an external interface 2a, to which a control/configuration unit 5 is connected. In addition to the interface 5b for connection to the central unit 2, the control/configuration unit 5 also has an interface 5a for connection of a programmer.

The invention claimed is:

1. A switchgear assembly module for controlling and monitoring at least one electrical load in an outgoer of a low-voltage switchgear assembly, having at least one communication interface for connection to a bus system, having a programmable controller and having configurable protective functions, wherein
   the switchgear assembly module is formed from interchangeable components and has at least one central unit as well as at least one bus connection unit with a communication interface to control and monitor the at least one electrical load in the outgoer of a low-voltage switchgear assembly,
   additional connection slots are provided for holding at least one power unit and at least one input/output unit, and
   an internal bus is provided for communication from the central unit with the other components for the central unit to process data received from the other components which are located in the switchgear assembly module.

2. The switchgear assembly module as claimed in claim 1, wherein the central unit has a programmable control and configurable protective functions, and wherein an external interface is provided for connection of a control/configuration unit or of a programmer.

3. The switchgear assembly module as claimed in claim 2, wherein the external interface is an electrical, optical or wire-free interface.

4. The switchgear assembly module as claimed in claim 1, wherein an input/output unit has binary inputs, binary outputs, analogue inputs, analogue outputs or a combination thereof.

5. The switchgear assembly module as claimed in claim 1, wherein the at least one bus connection unit together with one or more further bus connection units that are provided and/or one or more input/output units that are provided forms an interface unit.

6. The switchgear assembly module as claimed in claim 1, wherein a power unit has an outgoer section, a feed section, a measurement device and a processing unit.

7. The switchgear assembly module as claimed in claim 6, wherein a power unit additionally has a main switching device and/or a switch disconnector.

8. The switchgear assembly module as claimed in claim 6, wherein the measurement device has one or more sensors for current measurement, and/or for voltage measurement and/or for temperature measurement.

9. The switchgear assembly module as claimed in claim 8, wherein the measurement device has further sensors for measurement of further environmental variables.

10. The switchgear assembly module as claimed in claim 7, wherein the processing unit is an electronic circuit and has inputs for reading values measured by the measurement device, and/or inputs for reading a position message from the main switching device and/or from the switch disconnector and/or other status messages and/or outputs for driving the main switching device and/or the switch disconnector and/or other appliances.

11. The switchgear assembly module as claimed in claim 10, wherein the processing unit has means in order to use currents and voltages read by the measurement Device to calculate a real power supplied to a load, a wattless component supplied to the load, the volt-amperes supplied to the load, a power factor and a mains frequency.

12. The switchgear assembly module as claimed in claim 2, wherein the control/configuration unit has a first interface for connection to the external interface, as well as visual indications and/or switches and/or keys.

13. The switchgear assembly module as claimed in claim 12, wherein the first interface is an electrical, optical or wire-free interface.

14. The switchgear assembly module as claimed in claim 12, wherein the control/configuration unit has a second interface for connection of a programmer.

15. The switchgear assembly module as claimed in claim 14, wherein the second interface is an electrical, optical or wire-free interface.

16. The switchgear assembly module as claimed in claim 2, wherein a standard PC with a programming interface, or a standard PDA with a programming interface is provided as the programmer.

17. The switchgear assembly module as claimed in claim 2, wherein the central unit has an integrated web server, which allows programming of the programmable controller and/or configuration of the protective functions, and/or control of the switchgear assembly module with an aid of a standard web browser installed in the programmer.

* * * * *